Aug. 18, 1936.   H. HUNZIKER   2,051,557
PIPE JOINT, PARTICULARLY FOR CONCRETE PIPES
Filed May 4, 1935
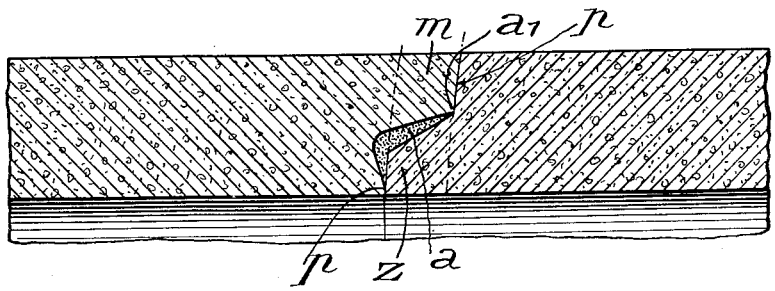
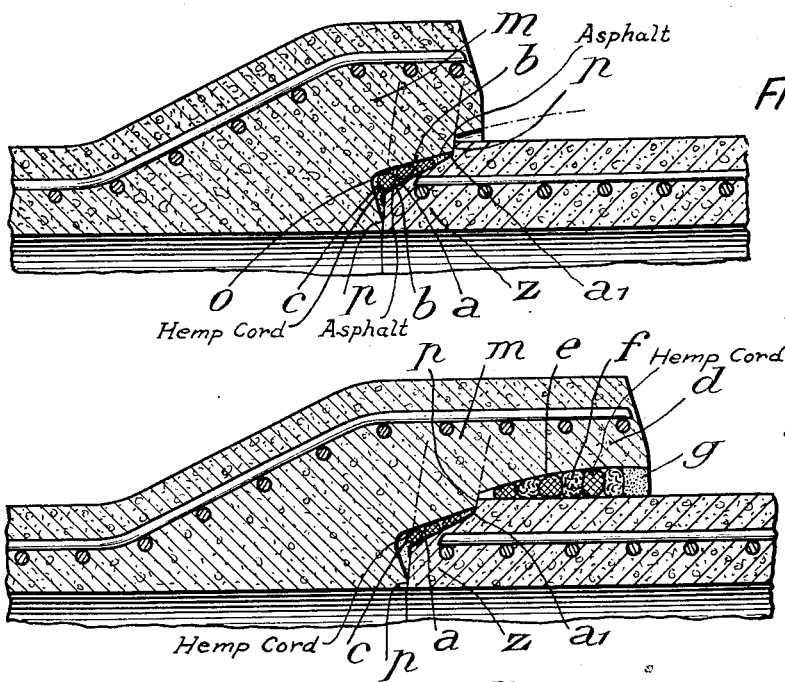
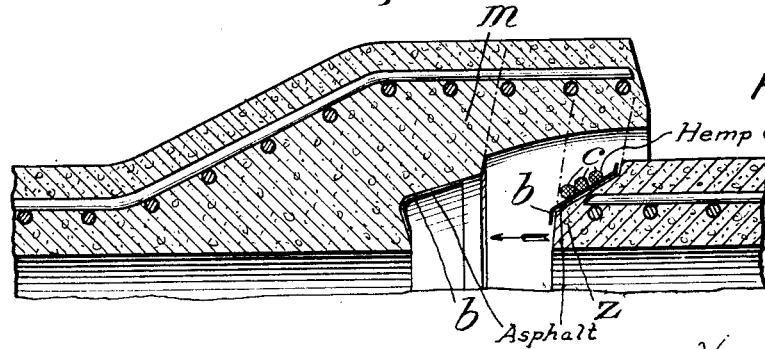
INVENTOR:
Hans Hunziker
By Sommers & Young
Attys.

Patented Aug. 18, 1936

2,051,557

UNITED STATES PATENT OFFICE 2,051,557

PIPE JOINT, PARTICULARLY FOR CONCRETE PIPES

Hans Hunziker, Brugg, Switzerland, assignor to firm Aktiengesellschaft Hunziker & Cie., Zurich, Baustoffabriken Brugg und Alten, Brugg, Switzerland Application May 4, 1935, Serial No. 19,899
In Switzerland December 15, 1934

1 Claim. (Cl. 285—163)

This invention relates to pipe joints particularly for concrete pipes.

The pipe joint according to the invention is distinguished by a wedge-shaped groove the edge of which is outwardly directed and which receives the packing material so that on each rise in pressure inside the pipe conduit the packing is forced towards the edge of the groove thereby increasing the sealing effect of the joint, while dislocation of the packing is prevented.

This pipe joint is of a simple construction, easy to manufacture and comes up to the requirements of actual practice, as tests have shown.

The junction of the two flanks of the wedge at the edge thereof may serve at the same time for centering the two adjoining pipes, in order to obtain a smooth continuous inner wall of the pipe conduit.

The packing may consist for example, of hemp cord soaked in asphalt or of ductile flexible putty or else a soft annular rubber packing may be used.

The accompanying drawing illustratively exemplifies the pipe joint according to the invention in three constructional forms.

In the drawing

Figs. 1 to 3 each show a longitudinal elevation of a different constructional form of the pipe joint; and Fig. 4 illustrates a first working stage in effecting the pipe joint as per Fig. 3.

In Fig. 1 a pipe joint for two plain straight concrete pipes for an internal pressure slightly higher than atmospheric pressure or else atmospheric pressure is shown. The end faces of the two abutting pipes are so constructed that at the joint a groove $a$ of a wedge-shaped cross-section is formed which is filled with cement mortar or a durable flexible putty. One of the two pipe ends is provided with a socket $m$ formed by an exterior annular rib, the thickness of which is approximately equal to half the thickness of the wall of the pipe, whereas the adjoining end of the other pipe is provided with a tenon $z$ formed by an interior annular rib, so that the two pipe ends can be moved into interengagement with but little effort, thus avoiding cracking the socket $m$ by wedge action of the packing $a$. The edge $a_1$ of the wedge-shaped groove $a$ is situated at the outermost end of the groove, so that in the event of pressure reigning in the interior of the pipe conduit the packing $a$ is forced against the edge $a_1$ of the wedge, thus being compressed and thereby sealing the pipe joint more effectively. At the same time dislocating the packing beyond the groove is prevented.

In the second constructional form of the pipe joint shown in Fig. 2 the pipe end provided with the socket $m$ is reinforced by means of a radially projecting rim in order to be capable of sustaining a relatively high interior pressure. This construction is particularly well suited for pipe joints which are submerged in water and which can thus not be worked from outside, for example for being caulked. A construction of this kind, when applied to relatively small pipes, calls for the pipes to be embedded in concrete at points spaced 30 to 50 meters apart, in order to fix the pipes thereat for preventing the same from creeping in the direction of the conduit, as the latter is not sufficiently retained in watery ground by friction action alone. Prior to laying the pipes the rabbet $o$ formed by the socket $m$ as well as the sealing face of the tenon $z$ are coated with asphalt or bitumen $b$ while on the tenon $z$ three or four turns of hemp cord $c$ of 6 millimeters diameter and soaked in asphalt are wound. All these materials stick firmly to dry concrete. When the pipes are lowered into the ditch, the thus formed elastic packing requires forcibly assembling the pipe ends by means of a tensioning device, until they are moved into interengagement. During this operation again a wedge-shaped groove $a$ is formed for the packing material.

In the pipe joint shown in Fig. 3 the socket $m$ is provided with an extension $d$ providing a bell-shaped enlargement thereof, so that between the extension $d$ and the lapping adjoining pipe end in addition to the wedge-shaped packing groove $a$, an open space is formed into which, during adjusting the pipes to position of use, alternately hemp cords $e$ and $f$ soaked with asphalt and devoid of an asphalt impregnation respectively and a small terminal seal $g$ of cement mortar are jammed by caulking.

The material $e$, $f$, $g$ thus jammed in provides a fastening joint and prevents disengagement between the interengaging pipe ends. The fastening effect of this joint is assisted by friction action of the soil after the pipes are covered by the same. The fastening joint is of similar construction as the packing groove in the respect that it is resilient, elastic and flexible, in which way the assembled conduit is permitted to slightly sag out of alignment, if necessary. Such a slight sagging is rendered possible for the pipe joints hereinbefore exemplified in three constructions by virtue of the fact that each two connected pipe ends are provided with end bearing faces p shaped in the manner of a ball and socket joint for an angular range of several degrees of deviation of the adjoining pipes from the straight course.

In the three constructional examples as shown in the Figs. 1 to 3, the sealing joint a is closed towards the interior of the pipe conduit by the inner bearing faces p of the two pipe ends, in which way shifting of the packing material into the pipe conduit is prevented.

When large inner pipe diameters permitting a person to pass through the pipe are involved, the bearing faces of the two pipe ends may be so constructed that a gap opening to the interior of the pipe conduit and flaring towards outside is left. This construction permits of caulking the packing material from inside and closing the outwardly flaring gap by means of cement mortar which is then retained by this gap (Fig. 4).

Fig. 4 shows how the sealing joint a and the fastening joint e, f, g are formed during inserting the pipe end z into the adjoining pipe end. On definitely pushing the pipe end z into position of adjustment, the adjoining profiles meet at the edge $a_1$ of the joint a, thus centering the inserted pipe with respect to the stationary pipe exactly and retaining the pipe joint firmly in the desired position, which is of particular importance for pipes of less than 50 centimeters diameter that cannot be inspected from inside. The tenon z of the pipe to be inserted is previously coated with asphalt b and wound with hemp cords soaked in asphalt, as indicated in Fig. 2. On the insertion of the pipe end z the fastening joint e, f. g is caulked in the manner hereinbefore described.

I do not limit myself to the particular size, shape, number or arrangement of parts as shown and described, all of which may be varied without going beyond the scope of my invention as shown, described and claimed.

What I claim is:

In a pipe joint particularly for concrete pipes, in combination, complementary surfaces disposed at either end of two adjoining pipes, adapted to interengage, mating portions of said surfaces slanting outwardly in the joint to form conjointly a groove of a wedge-shaped cross-section, bearing faces on the interengaging pipe ends adapted to abut one against the other in the manner of a ball and socket joint on assembling said pipe ends, and a resilient packing enclosed in said groove permitting said pipe ends to deflect out of axial alignment about said ball and socket joint.

HANS HUNZIKER.